United States Patent
Lucas

(10) Patent No.: US 11,358,618 B2
(45) Date of Patent: *Jun. 14, 2022

(54) CROSSING OBSTRUCTION DETECTION SYSTEM

(71) Applicant: Westinghouse Air Brake Technologies Corporation, Wilmerding, PA (US)

(72) Inventor: James Lucas, Ponte Vedra, FL (US)

(73) Assignee: WESTINGHOUSE AIR BRAKE TECHNOLOGIES CORPORATION, Wilmerding, PA (US)

(*) Notice: Subject to any disclaimer, the term of this patent is extended or adjusted under 35 U.S.C. 154(b) by 23 days.

This patent is subject to a terminal disclaimer.

(21) Appl. No.: 16/600,147

(22) Filed: Oct. 11, 2019

(65) Prior Publication Data

US 2021/0107540 A1    Apr. 15, 2021

(51) Int. Cl.
| | |
|---|---|
| *B61L 23/04* | (2006.01) |
| *B61L 23/34* | (2006.01) |
| *G08G 1/01* | (2006.01) |
| *G06V 20/54* | (2022.01) |
| *G06V 20/58* | (2022.01) |

(52) U.S. Cl.
CPC ............. *B61L 23/041* (2013.01); *B61L 23/34* (2013.01); *G06V 20/54* (2022.01); *G06V 20/58* (2022.01); *G08G 1/0116* (2013.01)

(58) Field of Classification Search
CPC ..... B61L 23/041; B61L 23/34; G08G 1/0116; G06K 9/00785; G06K 9/00805

USPC .............. 340/937, 901, 905–906, 916–917, 340/435–436, 539.1, 539.11; 701/19
See application file for complete search history.

(56) References Cited

U.S. PATENT DOCUMENTS

| | | | |
|---|---|---|---|
| 5,508,930 A * | 4/1996 | Smith, Jr. .......... | G01C 21/3415 340/988 |
| 8,596,587 B2 | 12/2013 | Hilleary | |
| 8,909,396 B2 | 12/2014 | Hilleary | |
| 9,193,367 B2 | 11/2015 | Hilleary | |
| 2016/0189552 A1 | 6/2016 | Hilleary | |
| 2016/0200334 A1 | 7/2016 | Hilleary | |
| 2017/0313331 A1 | 11/2017 | Hilleary | |
| 2019/0135317 A1 | 5/2019 | Hilleary | |
| 2019/0145791 A1* | 5/2019 | Rempel ................ | G08G 1/0145 701/410 |

OTHER PUBLICATIONS

Sland Radar, "Train Detection", Wavetronix Company, 2019.

* cited by examiner

*Primary Examiner* — Daryl C Pope
(74) *Attorney, Agent, or Firm* — The Small Patent Law Group, LLC; Mary D. Lawlor

(57) ABSTRACT

An obstruction detection system receives sensor data from sensor assemblies at different crossings of routes on which vehicles travel. The system determines whether an obstruction is present in one or more of the crossings based on the sensor data. The system wirelessly restricts movement of one or more vehicles responsive to determining that the obstruction is present by wirelessly communicating a notification signal to the one or more vehicles.

20 Claims, 3 Drawing Sheets

CROSSING OBSTRUCTION DETECTION SYSTEM

BACKGROUND

Technical Field

The subject matter described relates to systems and methods that monitor route crossings to determine whether obstructions exist and that can warn approaching vehicles of the obstructions before reaching the crossing(s).

Discussion of Art

Many vehicles travel on routes that cross each other. For example, rail vehicles travel along tracks that may intersect with a road at a crossing. Another vehicle (e.g., an automobile) may obstruct the crossing by being in the crossing in a location that would result in a collision with the rail vehicle if the rail vehicle were to travel through the crossing. For example, the automobile may become trapped between lowered gates or the automobile may be experiencing failures resulting in an inability of the automobile to move out of the crossing.

Some known systems detect the presence of an automobile in a crossing using radar and provide warnings to railroad personnel. But, these warnings may be missed by the personnel. This can result in the personnel failing to apply brakes or otherwise slow the rail vehicle to prevent a collision with the automobile.

BRIEF DESCRIPTION

In one embodiment, an obstruction detection system is provided that includes a wayside camera assembly configured to generate image data of a track crossing on which rail vehicles travel and a controller configured to determine whether an obstruction is present on the track crossing based on the image data from the wayside camera assembly. The controller is configured to communicate a warning bulletin to one or more of the rail vehicles responsive to determining that the obstruction is present in the track crossing. The warning bulletin instructs the one or more rail vehicles to slow or stop movement to avoid collision with the obstruction in the track crossing.

In one embodiment, a method (e.g., for detecting an obstruction on or along a route) includes monitoring one or more characteristics of a route on which vehicles travel using a sensor assembly located on or along the route, determining whether an obstruction is present on the route based on the one or more characteristics monitored by the sensor assembly, and communicating a warning bulletin to one or more of the vehicles responsive to determining that the obstruction is present on the route. The warning bulletin instructs the one or more vehicles to change movement to avoid collision with the obstruction.

In one embodiment, a system (e.g., an obstruction detection system) includes one or more processors configured to receive sensor data from sensor assemblies at different crossings of routes on which vehicles travel. The one or more processors are configured to determine whether an obstruction is present in one or more of the crossings based on the sensor data. The one or more processors are configured to wirelessly restrict movement of one or more of the vehicles responsive to determining that the obstruction is present on the one or more crossings by wirelessly communicating a notification signal to the one or more vehicles.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
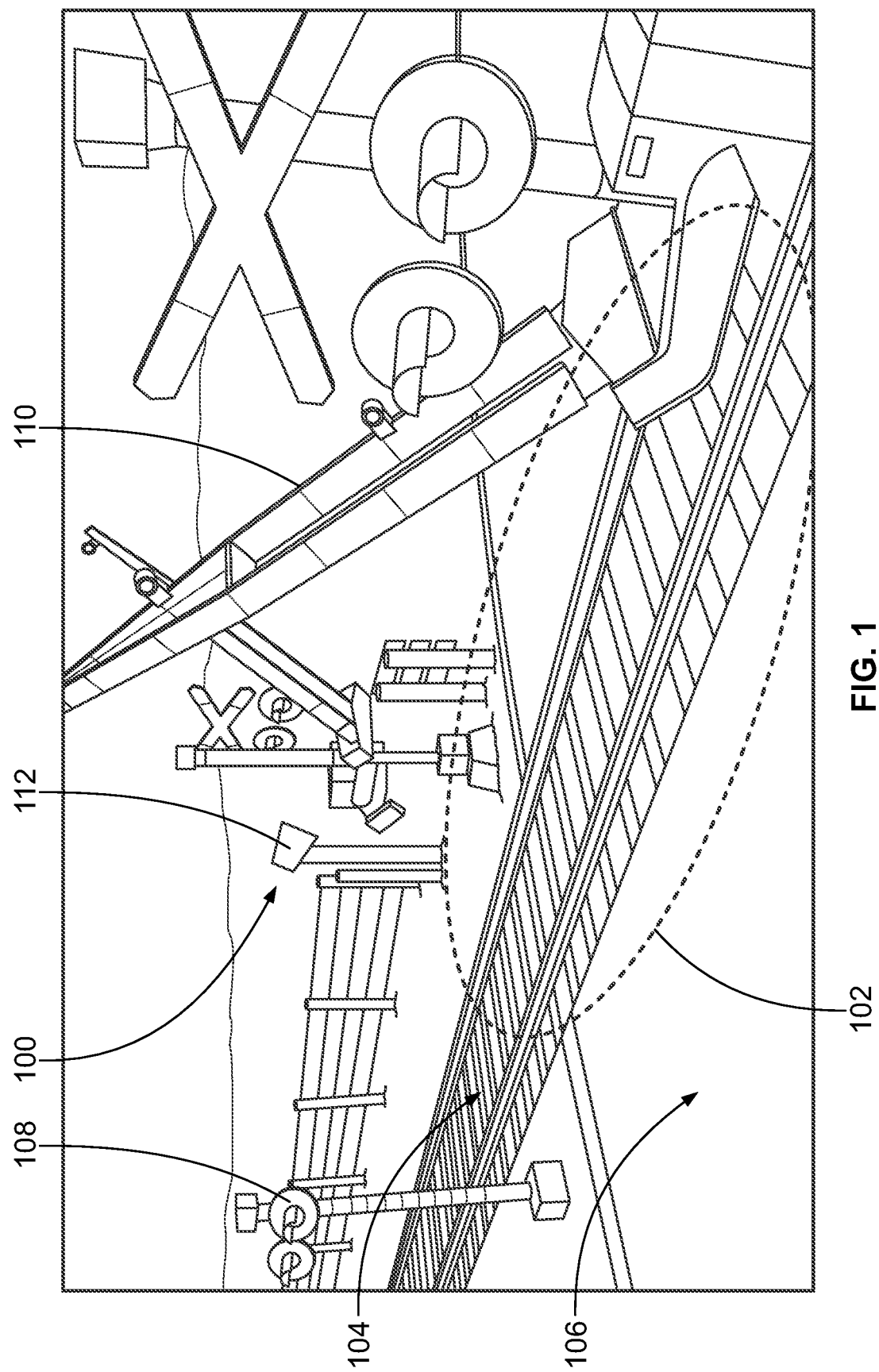
FIG. 1 illustrates one example of an obstruction detection system.

Embodiments of the subject matter described herein relate to systems and methods that determine whether an obstruction is present in a crossing of a route and that notify vehicles approaching the crossing of the obstruction so that the vehicles can change movement to avoid colliding with the obstruction. In one example, the systems and methods integrate the detection of the obstruction with a centralized control system that warns vehicles equipped with positive train control systems, and the onboard positive train control systems can automatically apply brakes to slow or stop movement of the vehicle before the vehicle collides with the obstruction. The systems and methods described herein can be used with rail vehicle systems (e.g., a train) equipped with an onboard positive train control systems. Stationary wayside cameras can detect the presence of a vehicle (e.g., an automobile) within a crossing between a track and another type of route (e.g., a road). A warning signal is communicated from the wayside cameras responsive to the wayside cameras detecting the presence of an obstruction in the crossing. This warning signal can be communicated to a centralized control center (e.g., a back office server), which then communicates the warning to rail vehicle systems heading toward the location of the obstruction. The rail vehicle systems having positive train control systems and headed toward the crossing receive the warning and the positive train control systems automatically apply brakes of the rail vehicle systems. This prevents the rail vehicle systems from entering the crossing having the obstruction and colliding with the obstruction.

Not all embodiments described herein are limited to rail vehicle systems, positive train control systems, cameras, crossings between routes, slowing or stopping as a responsive action, and/or automobiles as obstructions in a crossing. For example, one or more embodiments of the detection systems and methods described herein can be used in connection with other types of vehicles, such as automobiles, trucks, buses, mining vehicles, marine vessels, aircraft, or the like. The systems and methods can warn these other types of vehicles of obstructions to prevent collisions between the vehicles and the obstructions. As another example, one or more embodiments can be used with vehicle control systems other than positive train control systems to change movement of a vehicle responsive to receiving a warning of an obstruction.

Additionally, one or more embodiments may use sensors other than cameras to detect an obstruction. For example, radar systems, lidar systems, weight scales, or the like, may be used to detect obstructions. The obstructions may be detected in locations other than crossings (e.g., intersections) between two or more routes. For example, one or more embodiments described herein may be used to detect an obstruction along a route in a location that is not a crossing between the route and at least one other route. The onboard control systems may implement a responsive action other than slowing or stopping movement of the vehicle responsive to receiving a warning of an obstruction. For example, the onboard control systems may change which route the vehicle is traveling on to avoid colliding with the obstruction. The obstructions that are detected may be objects other than automobiles.

FIG. 1 illustrates one example of an obstruction detection system 100. The detection system may be disposed at a crossing 102 between two or more routes 104, 106. The crossing can be an intersection between the routes. The crossing can include one or more signals 108, gates 110, or the like. Optionally, the crossing does not include a signal or gate. The routes can be tracks, roads, or the like, on which vehicles travel. The signals may include lights that are activated to warn vehicles traveling on one route (e.g., the road) of a vehicle approaching on another route (e.g., the track). The gates may be lowered to impede entry of a vehicle (e.g., automobile) into the crossing when another vehicle (e.g., a train) is approaching the crossing.

The detection system includes a wayside camera assembly 112 configured to generate image data of the crossing. The camera assembly can be stationary in that the camera assembly does not move while the vehicles moving on the routes pass by the camera assembly. The camera assembly includes one or more cameras having a field of view that includes the routes and/or crossing. The cameras can output data signals indicative of one or more characteristics of the routes and/or crossings. For example, the cameras can generate image or video data that is analyzed (e.g., by a controller of the camera assembly) to determine whether the image or video data indicate that a vehicle is obstructing the crossing. This controller can generate a warning signal responsive to detecting the presence of an obstruction in the crossing based on the image or video data. This warning signal optionally can be referred to as a warning bulletin. The warning signal can be communicated to a centralized location, such as a back-office server, that is off-board the vehicles traveling on the routes. The warning signal can be received by the centralized location. The centralized location can include a controller that determines which vehicles are near and/or approaching the crossing. The controller of the centralized location can then send the same or different warning signal (e.g., wirelessly) to the vehicles that are near and/or approaching the crossing to warn these vehicles of the detected obstruction. Onboard control systems of the vehicles can apply brakes or otherwise change movement of the vehicles to slow or stop movement of the vehicles before the vehicles collide with the obstruction.

Figure 2:
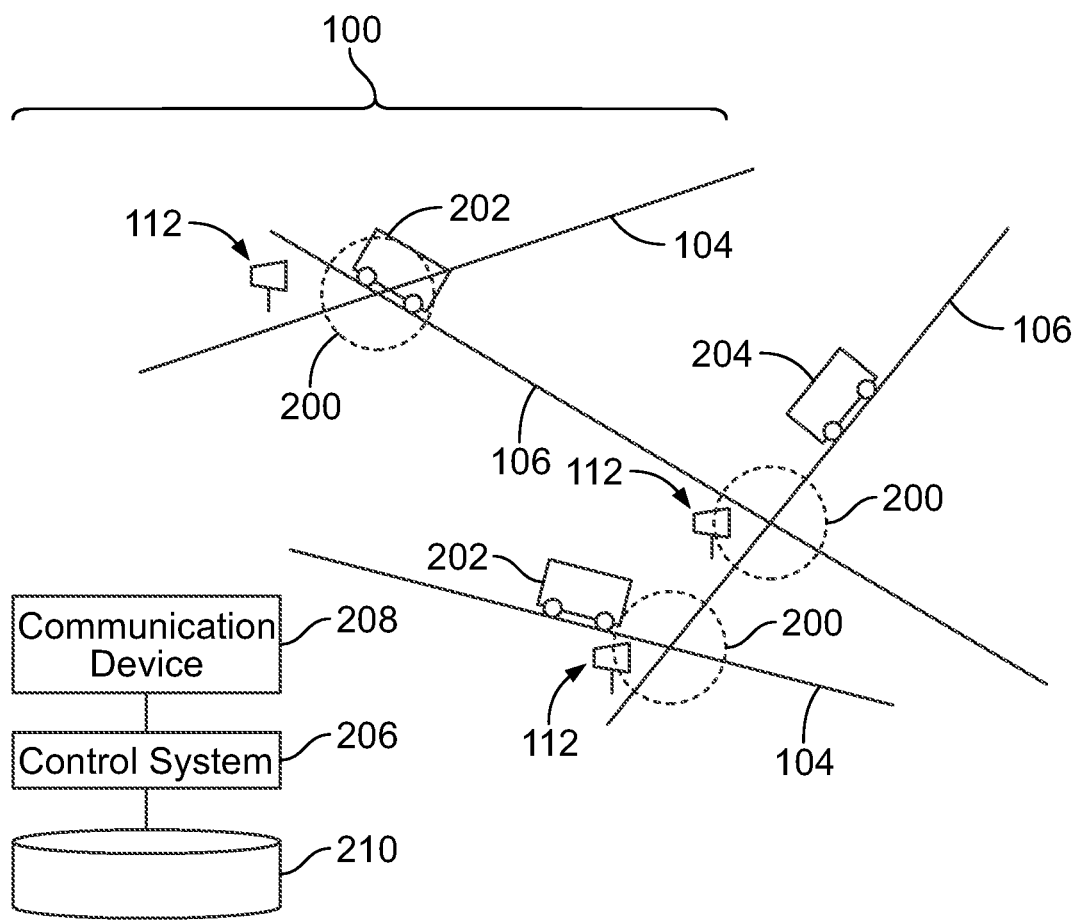
FIG. 2 illustrates the detection system shown in FIG. 1 communicating with several wayside camera assemblies located as several different crossings between routes.

While only one crossing is shown in FIG. 1, the detection system may be used with several crossings. For example, FIG. 2 illustrates the detection system communicating with several wayside camera assemblies located as several different crossings between routes. Each of the wayside camera assemblies can monitor characteristics of a different segment or portion of a route for an obstruction. For example, each wayside camera assembly can output and examine image and/or video data of a different crossing to determine whether an obstruction is present in the crossing. The wayside camera assembly can examine the characteristics of the route (e.g., the presence of an obstruction within a designated monitored area 200). This monitored area can correspond to a defined or fixed distance from the center of the crossing, can correspond to the field of view of the camera assembly, or can otherwise be defined by an operator. If the data output by the camera assembly indicates that an obstruction is present within the monitored area, then the camera assembly can determine that an obstruction is present.

The obstruction that is detected can be the presence of a vehicle 202 and/or 204 within the monitored area. In one embodiment, the vehicle 202 can represent an automobile while the vehicle 204 can represent a rail vehicle, such as a train, locomotive, or the like. But, not all embodiments of the inventive subject matter described herein are limited to automobiles and/or rail vehicles, as described above. The vehicles 202, 204 can represent other vehicles, such as both being automobiles or one or more of the vehicles 202, 204 representing buses, trucks, agricultural vehicles, mining vehicles, aircraft, marine vessels, or the like. The routes can represent tracks, roads, waterways, mining paths or tunnels, or the like.

Figure 3:
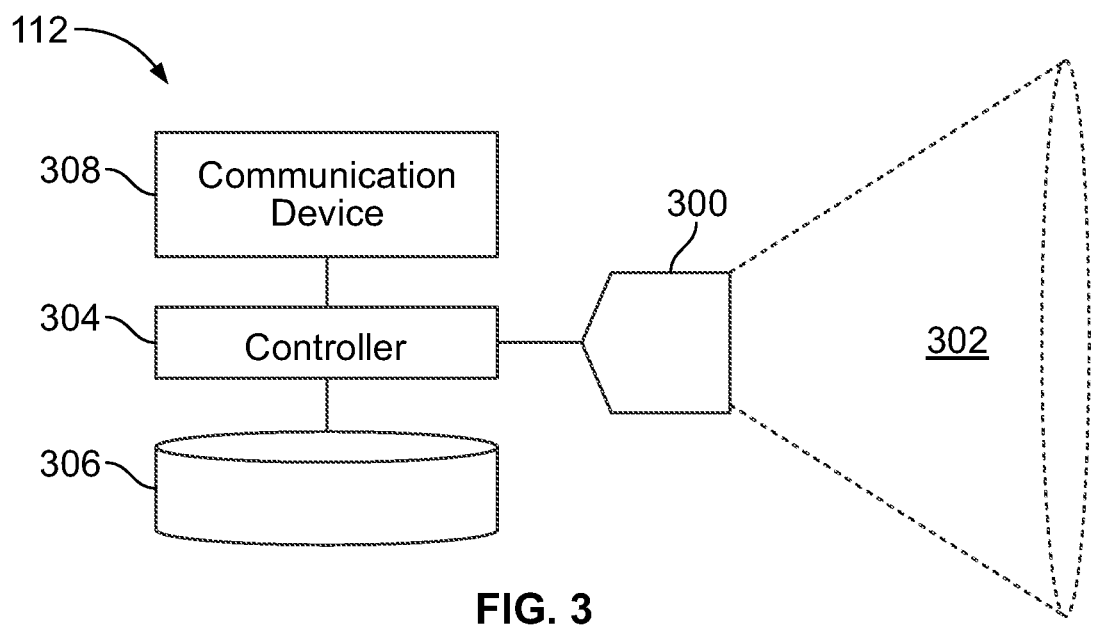
FIG. 3 illustrates one example of the wayside camera assembly shown in FIG. 1.

With continued reference to the detection system shown in FIG. 2, FIG. 3 illustrates one example of the wayside camera assembly shown in FIG. 1. The wayside camera assembly includes one or more sensors 300 that monitor one or more characteristics of the monitored area of the route. The sensor can represent a camera in one embodiment that outputs static images and/or videos within a field of view 302 of the camera. A controller 304 is the camera assembly receives the data output by the sensor and examines the data to determine whether an obstruction is present within the monitored area based on the data. The controller represents hardware circuitry that includes and/or is connected with one or more processors (e.g., one or more microprocessors, integrated circuits, microcontrollers, field programmable gate arrays, etc.) that perform operations described in connection with the camera assembly.

The controller can receive the sensor data and examine the sensor data to determine whether an obstruction is present. For example, with respect to image and/or video data, the controller can examine characteristics of pixels in the data to determine whether an obstruction (e.g., a vehicle) has appeared in the field of view of the camera and remain in the field of view for at least a designated period of time (e.g., thirty seconds, sixty seconds, etc.). Optionally, the controller can use one or more object detection algorithms, such as selective searching (grouping pixels having similar characteristics together and determining whether the grouped pixels represent a defined object, such as a vehicle). Alternatively, another object detection algorithm may be used.

The controller optionally can store the sensor data in a tangible and non-transitory computer-readable storage medium (e.g., memory 306 in FIG. 3). For example, responsive to determining that the sensor data indicates that an obstruction is present within the monitored area, the controller can direct the memory to electronically and/or magnetically store the sensor data. The sensor data can be stored to maintain a record of the detected obstructions for modifying or improving the algorithms used to determine whether obstructions are represented by the sensor data, for accident reconstruction purposes in the event that a collision does occur, etc.

Responsive to determining that an obstruction is present in the monitored area, the controller can communicate a signal to another location via a communication device 308. The communication device can represent circuitry that can communicate data signals wirelessly and/or via wired connections. For example, the communication device can represent transceiving circuitry, one or more antennas, modems, or the like, that communicate (e.g., broadcast and/or transmit) a warning signal that indicates detection of an obstruction in the monitored area. This warning signal can be sent before a vehicle approaching the monitored area reaches the monitored area.

The signal sent by the communication device of the camera assembly can be sent to a centralized location, such as a back-office server or system represented by a control system 206 in FIG. 2. This control system can be referred to as a vehicle management control system or an off-board control system as the control system is off-board the vehicles. The off-board control system can be separate and remote from the camera assemblies so that the off-board control system can receive the warning signals from multiple camera assemblies at the various different locations. The off-board control system can represent hardware circuitry that includes and/or is connected with one or more processors that perform the operations of the off-board control system. The off-board control system can include or be connected with a communication device 208 that can include some or all of the same components of the communication devices of the camera assemblies to communicate with the camera assemblies.

The off-board control system can be or include a back-office server of a positive train control system in one embodiment. Alternatively, the off-board control system can be another system that monitors movements of the vehicles to ensure safe travel of the vehicles. For example, the off-board control system can be a dispatch facility, a scheduling facility, or the like. The off-board control system can include a tangible and non-transitory computer-readable storage medium (e.g., a memory 210) that stores locations of the camera assemblies, locations of the monitored areas, and/or other information. Optionally, the off-board control system can store information on the warning signals in the memory.

Responsive to receiving the warning signal from a camera assembly, the off-board control system can communicate the same or a different signal to one or more of the vehicles. The off-board control system can communicate a warning bulletin to the vehicles that are heading toward and/or approaching (e.g., are within a designated distance, such as 10 kilometers) the monitored area where an obstruction is detected. This warning bulletin can instruct the vehicles to slow or stop movement before reaching the monitored area where the obstruction is detected.

Figure 4:
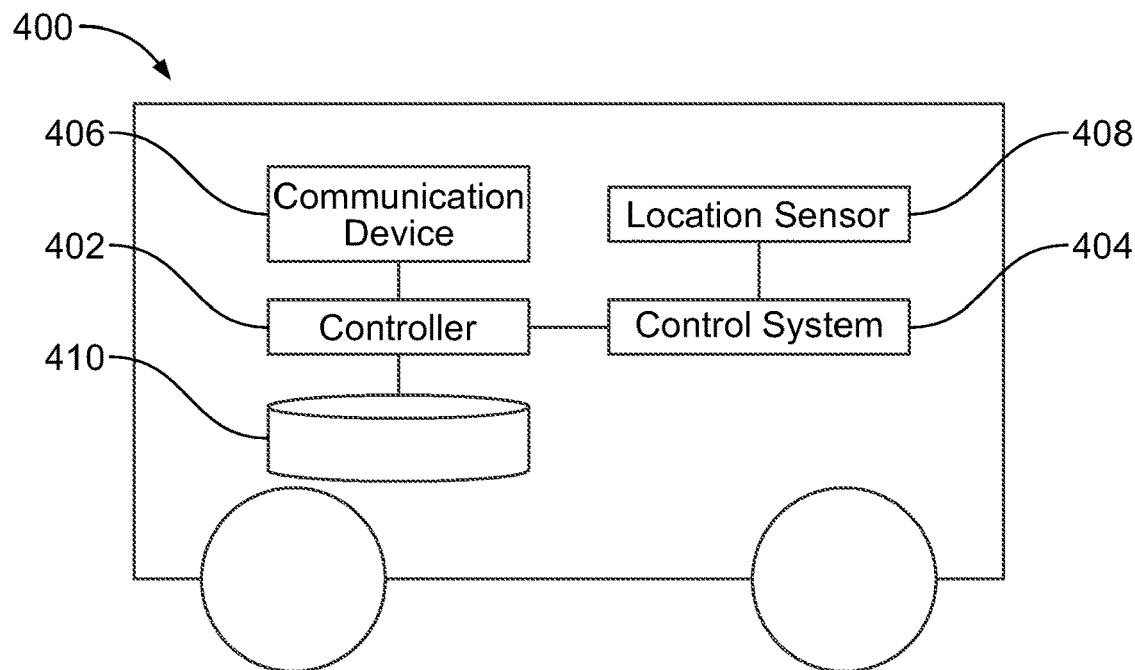
FIG. 4 illustrates one example of a vehicle shown in FIG. 2.

FIG. 4 illustrates one example of a vehicle 400. The vehicle shown in FIG. 4 can represent one or more of the vehicles 202, 204 shown in FIG. 2. The vehicle is shown as a land-based vehicle, such as a rail vehicle (e.g., locomotive), but optionally can be another type of land-based vehicle or may be a vehicle that travels via waterways and/or the air. The vehicle includes a controller 402 that represents one or more processors that control movement and other operations of the vehicle. This controller can be referred to as a vehicle controller. The vehicle controller can represent an engine control unit, an onboard navigation system, or the like, that can control a propulsion system (e.g., one or more engines, motors, etc.) and/or a braking system (e.g., one or more friction brakes, air brakes, regenerative brakes, etc.) to control movement of the vehicle.

The vehicle optionally includes a control system 404 that communicates with the off-board control system for limiting where and/or when the vehicle can move. For example, the control system onboard the vehicle can be referred to as a vehicle control system that can automatically apply brakes of the vehicle to slow or stop the vehicle based on warning bulletins received from the off-board control system. In one embodiment, the vehicle control system is an onboard component of a positive train control system that limits where and when the vehicle can move based on movement authorities, locations of other vehicles, or the like.

The warning signal or bulletin can be received by the vehicle controller and/or vehicle control system via a communication device 406. This communication device can include an antenna and wireless transceiving circuitry that wirelessly communicates signals with other communication devices described herein. A tangible and non-transitory computer-readable storage medium (e.g., a memory 410) of the vehicle may store locations and/or layouts of the routes, locations of the monitored areas, identities of the camera assemblies and the monitored areas examined by the camera assemblies, etc.

The vehicle control system can receive the warning bulletin sent from the off-board control system and can apply the brakes of the vehicle and/or control the propulsion system of the vehicle to slow or stop movement of the vehicle responsive to receiving the warning bulletin. For example, the onboard positive train control system of the vehicle can receive the warning bulletin that is sent responsive to the wayside camera assembly detecting an obstruction in a crossing. The onboard positive train control system can then warn an onboard operator to engage the brakes or can automatically apply the brakes to prevent a collision between the vehicle and the obstruction. Alternatively, the vehicle control system is not a positive train control system. The vehicle control system can receive the warning bulletin or signal from the off-board control system and engage the brakes or otherwise act to slow or stop movement of the vehicle.

In one example, the off-board control system may send the warning signal or bulletin to some, but not all, vehicles. The off-board control system can determine the locations of the vehicles and send the warning signal or bulletin to those vehicles that are traveling toward or are within a threshold distance (e.g., ten kilometers) of the monitored area where the obstruction is detected. The vehicles may include location sensors 408 that determine locations and/or headings of the vehicles. The location sensor can represent a global positioning system receiver, a wireless triangulation system, a dead reckoning system, inertial sensors, or the like, that determines locations and/or headings of the vehicle. The locations and/or headings of the vehicles can be determined by the location sensors and communicated from the vehicles to the off-board control system via the communication devices 406.

The warning signal received by the off-board control system from the camera assembly can identify the location of the monitored area where the obstruction is detected and/or can identify the camera assembly that detected the obstruction. The locations of the camera assemblies can be associated with different monitored areas in the memory of the off-board control system. The off-board control system can determine the location of the obstruction from the warning signal and/or the identity of the camera assembly that sent the warning signal. The off-board control can then direct the communication device 208 to send the warning bulletin only to those vehicles that are approaching the monitored area associated with the detected obstruction.

For example, the memory of the off-board control system can store locations and/or layouts of the routes, locations of the camera assemblies, and/or locations of the monitored areas. The off-board control system can receive a warning signal from a camera assembly indicating that an obstruction is detected in a monitored area. The off-board control system can determine where this monitored area is located based on or using this warning signal. The off-board control system can determine which vehicle(s) are headed toward this monitored area based on the location(s) of the vehicle(s), which route(s) the vehicle(s) is or are located on, and the location of the monitored area having the detected obstruction. The off-board control system can then send the warning bulletin to the vehicle control systems of only those vehicles headed toward the monitored area. Optionally, the off-board control system can then send the warning bulletin to the vehicle control systems of only those vehicles headed toward the monitored area and that will arrive at the monitored area (based on a distance to the monitored area and moving speed of the vehicle). This can prevent vehicles heading away from the obstruction or otherwise not headed toward the obstruction from being stopped when the risk of collision with the obstruction is low or non-existent.

In another example, the off-board control system may send a signal or bulletin to several vehicles that may or may not be headed toward the obstruction. This signal or bulletin can identify the location of the monitored area where the obstruction is detected. The vehicle control systems and/or vehicle controllers can examine the signal or bulletin and determine the location of the monitored area having the obstruction based on or using the received signal. The vehicle control systems and/or controller can determine whether the vehicle is headed toward this monitored area based on the route location and/or layout information stored in the memory onboard the vehicle and the information in the signal received from the off-board control system.

Optionally, one or more of the camera assemblies can send the warning signal or bulletin to the vehicle control systems or vehicle controllers without having the warning signal or bulletin first being sent to the off-board control system. For example, responsive to detecting an obstruction in a monitored area, the camera assembly of that monitored area can wirelessly communicate the warning signal to vehicle(s) heading toward the monitored area and/or within a communication range of the camera assembly. The vehicle controllers and/or vehicle control systems can determine whether the vehicles are headed toward the monitored area based on or using the received warning signal. The vehicle controllers and/or vehicle control systems can stop or slow movement of the vehicles in response to determining that the vehicles are headed toward the monitored area.

The vehicle controller and/or vehicle control system optionally can implement another action in response to receiving a warning bulletin indicating that the vehicle is headed toward a monitored area having a detected obstruction. For example, the vehicle controller and/or vehicle control system can present (e.g., visually, audibly, and/or haptically) a notice to an operator of the vehicle that informs the operator of the obstruction. The operator may then manually implement one or more actions to avoid collision with the obstruction. As another example, the vehicle controller and/or the vehicle control system can change which route the vehicle is moving along. The vehicle controller and/or vehicle control system can change (automatically or by instructing an operator) the heading of the vehicle to cause the vehicle to travel onto another route that does not direct the vehicle to the monitored area where the obstruction was detected. For example, the vehicle controller and/or vehicle control system can control a steering mechanism (e.g., steering wheel) to change which route is traveled on, can send a signal to a switch at a crossing (ahead of where the obstruction is detected) to cause the switch to change positions or states and direct the vehicle onto another route, or the like.

In another embodiment, the wayside camera assemblies may be sensor assemblies that include one or more sensors in addition to or as an alternate to the cameras. These sensors can measure or monitor one or more characteristics of a route to determine whether the obstruction is present on the route (whether the obstruction be in the crossing or in another location). For example, one or more of the sensor assemblies can include a radar system that provides radar data indicative of sensed obstructions, a lidar system that provides lidar data indicative of sensed obstructions, a weight scale in the route that provides weight data, or the like. Based on the radar data, lidar data, weight data, etc., the controller of the sensor assembly can determine whether an obstruction is present and communicate a warning signal or bulletin, as described above.

The detection system may rely on sensor data provided by multiple, different sensors to determine whether an obstruction is present along a route. For example, a sensor assembly can include two or more different types of sensors that measure characteristics of the route to determine whether an obstruction is present. The sensor assembly can include a camera and a scale, a radar system and a lidar system, a camera and a radar system, or the like. The controller of the sensor assembly can use the data from multiple, different types of sensors to confirm or refute the detection of an obstruction. For example, the controller of the sensor assembly may determine that an obstruction is present in a crossing responsive to two different sensors each outputting data indicative of an obstruction in a crossing. But, the controller of the sensor assembly may determine that an obstruction is not present in the crossing responsive to one sensor outputting data indicative of an obstruction in the crossing but another sensor outputting data that indicates that no obstruction is present in the crossing. Alternatively, the controller of the sensor assembly may determine that an obstruction is present if any sensor outputs data indicative of the presence of an obstruction, even if one or more (or all) other sensors output data that does not indicate that the obstruction is present.

One or more of the sensor assemblies may be mobile. For example, instead of all the sensor assemblies being stationary wayside assemblies, one or more of the sensor assemblies may move relative to the route(s). A mobile sensor assembly can include the sensor, controller, communication device, and/or memory shown in FIG. 3 disposed onboard a mobile device, such as an unmanned aircraft (e.g., drone), another vehicle moving near a monitored area on another route, or the like.

Figure 5:
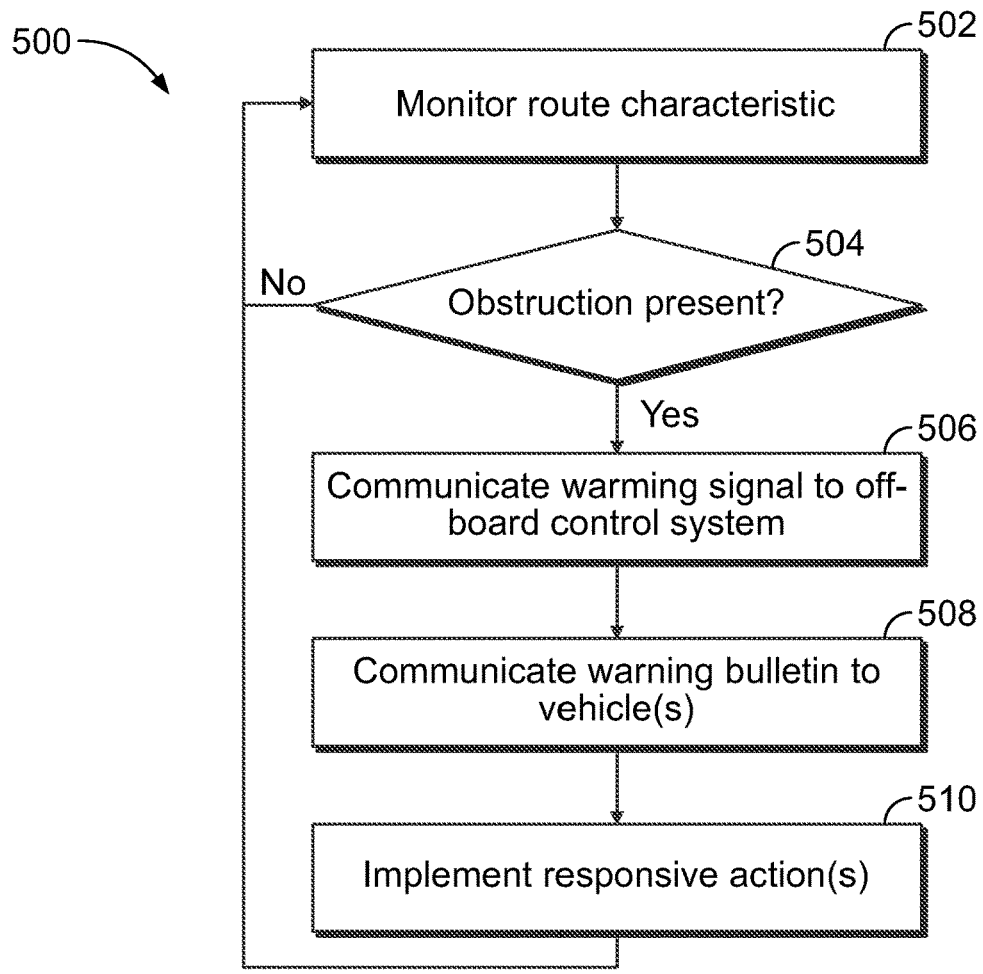
FIG. 5 illustrates a flowchart of one example of a method for detecting an obstruction of a route.

FIG. 5 illustrates a flowchart of one example of a method 500 for detecting an obstruction of a route. The method can represent operations performed by the detection system described above. At 502, one or more characteristics of the route are monitored. For example, a camera may be used to detect the presence or absence of an obstruction on the route (e.g., in a crossing) as a characteristic of the route. As another example, a radar system may be used to detect a time of flight of radar signals to determine whether an obstruction is present. As another example, light reflected to a lidar system can be monitored as the characteristic to determine whether the obstruction is present. In another example, weight of the route (or on the route) can be measured as the characteristic to determine whether an obstruction is present.

At 504, a determination is made as to whether an obstruction is present along the route. The characteristic(s) can be examined to determine whether the obstruction is in a crossing or other location of the route. For example, the image or video data can be examined to determine if an obstruction has entered the field of view of the camera (and remained within the field of view). As another example, the time of flight of the radar system can be examined to determine if the time of flight has decreased (thereby indicating the presence of an obstruction). As another example, changes in reflections of structured light emitted by a lidar system can be examined to determine if the changed locations of the structured light indicates that the obstruction is present. In another example, the measured weight of the route (or on the route) can be examined to determine whether the weight has increased (thereby indicating the presence of the obstruction).

If an obstruction is detected, then flow of the method can proceed toward 506. If no obstruction is detected, then flow of the method can return toward 502 to continue monitoring characteristic(s) of the route. Optionally, the method can terminate. At 506, a warning signal is communicated to an off-board control system. For example, a warning signal can be wirelessly communicated from a camera assembly that detected the obstruction to a back-office server of a positive train control system. As another example, the warning signal can be communicated from a sensor assembly that detected the obstruction to another location. This warning signal can indicate that the obstruction was detected at a crossing (or another location along a route).

At 508, a warning bulletin is communicated to one or more vehicles. For example, responsive to the back-office server receiving the warning signal from a camera assembly, the back-office server can send a warning bulletin to one or more vehicles heading toward the obstruction. Alternatively, responsive to the off-board control system receiving the warning signal from a sensor assembly, the off-board control system can send a warning bulletin to one or more vehicles heading toward the obstruction.

At 510, one or more responsive actions are implemented. For example, the positive train control system onboard a vehicle can receive the warning bulletin and automatically engage brakes to slow or stop movement of the vehicle (and prevent a collision with the detected obstruction). As another example, another vehicle control system may engage brakes of the vehicle, may change which route the vehicle is traveling on, or the like, to avoid collision with the detected obstruction. Flow of the method can return toward 502 or may terminate.

In one embodiment, an obstruction detection system is provided that includes a wayside camera assembly configured to generate image data of a track crossing on which rail vehicles travel and a controller configured to determine whether an obstruction is present on the track crossing based on the image data from the wayside camera assembly. The controller is configured to communicate a warning bulletin to one or more of the rail vehicles responsive to determining that the obstruction is present in the track crossing. The warning bulletin instructs the one or more rail vehicles to slow or stop movement to avoid collision with the obstruction in the track crossing.

Optionally, the controller is configured to communicate the warning bulletin with a positive train control system onboard the one or more rail vehicles. The wayside camera assembly can include a stationary camera oriented such that a field of view of the camera produces one or more images or video of the track crossing to the controller as the one or more characteristics of the track crossing. The wayside camera assembly may be stationary relative to the rail vehicles.

The wayside camera assembly can be one of several wayside camera assemblies at different track crossings, and the controller can be one of several controllers associated with the wayside camera assemblies. Each (or at least two different ones) of the controllers can be configured to receive sensor data indicative of the one or more characteristics of the different track crossings from the corresponding wayside camera assembly to determine whether the obstruction is present at the corresponding track crossing.

The controllers can be configured to communicate the warning bulletin to the rail vehicles moving toward the one or more track crossings where the obstruction is detected. The controller can be configured to communicate the warning bulletin to the one or more rail vehicles to direct the one or more rail vehicles to slow or stop movement before reaching the track crossing. The controller can be configured to communicate the warning bulletin to the one or more rail vehicles to direct the one or more vehicles to travel onto another track and avoid the track crossing before reaching the track crossing.

In one embodiment, a method (e.g., for detecting an obstruction on or along a route) includes monitoring one or more characteristics of a route on which vehicles travel using a sensor assembly located on or along the route, determining whether an obstruction is present on the route based on the one or more characteristics monitored by the sensor assembly, and communicating a warning bulletin to one or more of the vehicles responsive to determining that the obstruction is present on the route. The warning bulletin instructs the one or more vehicles to change movement to avoid collision with the obstruction.

Optionally, the one or more characteristics are monitored to determine whether the obstruction is located at a crossing of the route. The one or more characteristics can be monitored by multiple, different sensors configured to monitor the one or more characteristics using different techniques. The obstruction can be determined to be present by examining different data provided by the multiple different sensors. The obstruction may be determined to be present based on one or more of images of the route, video of the route, radar data from a radar system, lidar data from a lidar system, or weight data from a scale as the one or more characteristics of the route.

The one or more characteristics of the route can be monitored from a sensor assembly disposed onboard a mobile device. Optionally, the one or more characteristics are monitored by several sensor assemblies at different locations, and the obstruction is identified at one or more of the different locations based on the one or more characteristics.

The warning bulletin can be communicated to the one or more vehicles to direct the one or more vehicles to slow or stop movement before reaching the obstruction. The warning bulletin can be communicated to the one or more vehicles to direct the one or more vehicles to travel onto another route and avoid the obstruction before reaching the obstruction.

In one embodiment, a system (e.g., an obstruction detection system) includes one or more processors configured to receive sensor data from sensor assemblies at different crossings of routes on which vehicles travel. The one or more processors are configured to determine whether an obstruction is present in one or more of the crossings based on the sensor data. The one or more processors are configured to wirelessly restrict movement of one or more of the vehicles responsive to determining that the obstruction is present on the one or more crossings by wirelessly communicating a notification signal to the one or more vehicles.

Optionally, the one or more processors are configured to receive different types of the sensor data the sensor assemblies. The one or more processors can be configured to receive one or more of an image, a video, radar data, lidar system data, or a weight measurement as the sensor data.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   a wayside camera assembly configured to generate image data of a route crossing on which vehicles travel; and
   a controller configured to determine whether an obstruction is present on the route crossing based on the image data from the wayside camera assembly, the controller disposed at a location separate from the wayside camera assembly and the route crossing, the controller configured to determine a distance between a location of the vehicles and a location of the route crossing, the controller configured to determine a speed of movement of the vehicles and a direction of movement of the vehicles, the controller configured to communicate a warning bulletin to one or more of the vehicles responsive to determining that the obstruction is present in the route crossing and based on one or more of the distance between the one or more vehicles and the route crossing, the speed of movement of the one or more vehicles, or the direction of movement of the one or more vehicles,
   wherein the warning bulletin is configured to automatically control a brake setting of a brake system of the one or more vehicles to slow or stop movement of the one or more vehicles, the brake setting based on the location of the one or more vehicles relative to the location of the route crossing, the speed of movement of the one or more vehicles, and the direction of movement of the one or more vehicles.

2. The system of claim 1, wherein the controller is configured to communicate the warning bulletin with a positive vehicle control system onboard the one or more vehicles.

3. The system of claim 1, wherein the wayside camera assembly includes a stationary camera oriented such that a field of view of the camera produces one or more images or video of the route crossing to the controller as one or more characteristics of the route crossing.

4. The system of claim 1, wherein the wayside camera assembly is one of several wayside camera assemblies at different route crossings, and the controller is one of several controllers associated with the wayside camera assemblies, each of the controllers configured to receive sensor data indicative of one or more characteristics of the different route crossings from the corresponding wayside camera assembly to determine whether the obstruction is present at the corresponding route crossing.

5. The system of claim 4, wherein the controllers are configured to communicate the warning bulletin to the rail vehicles moving toward the one or more route crossings where the obstruction is detected.

6. The system of claim 1, wherein the controller is configured to communicate plural different warning bulletins to the one or more vehicles, wherein the controller is configured to communicate a first warning bulletin to automatically control the brake system of a first vehicle of the one or more vehicles to have a first brake setting to slow movement based on one or more of the location or the speed of movement of the first vehicle, and the controller is configured to communicate a different, second warning bulletin to automatically control the brake system of a second vehicle of the one or more vehicles to have a second brake setting to stop movement based on one or more of the location or the speed of movement of the second vehicle.

7. The system of claim 1, wherein the controller is configured to communicate the warning bulletin to the one or more vehicles to direct the one or more vehicles to travel onto another route and avoid the route crossing before reaching the crossing.

8. The system of claim 1, wherein the controller is configured to communicate the warning bulletin to a first vehicle of the one or more vehicles based on the location of the first vehicle being within a threshold distance away from the obstruction, wherein the controller is not configured to communicate the warning bulletin to a second vehicle of the one or more vehicles based on the location of the second vehicle being outside of the threshold distance away from the obstruction.

9. A method comprising:
monitoring one or more characteristics of a route on which vehicles travel using a sensor assembly located on or along the route;
determining whether an obstruction is present on the route based on the one or more characteristics monitored by the sensor assembly at a location away from the route;
determining one or more of a location of the vehicles, a distance between the location of the vehicles and a location of the obstruction, a speed of movement of the vehicles, or a direction of movement of the vehicles;
communicating one or more warning bulletins to one or more of the vehicles responsive to determining that the obstruction is present on the route, the one or more warning bulletins being communicated to the one or more vehicles based on the location of the one or more vehicles, the speed of movement of the one or more vehicles, and the direction of movement of the one or more vehicles; and
automatically controlling a brake setting of a brake system of the one or more vehicles to slow or stop movement of the one or more vehicles, the brake setting based on one or more of the location of the one or more vehicles relative to the location of the location of the obstruction, the speed of movement of the one or more vehicles, or the direction of movement of the one or more vehicles.

10. The method of claim 9, wherein the one or more characteristics are monitored to determine whether the obstruction is located at a crossing of the route.

11. The method of claim 9, wherein the one or more characteristics are monitored by multiple, different sensors configured to monitor the one or more characteristics using different techniques.

12. The method of claim 11, wherein the obstruction is determined to be present by examining different data provided by the multiple different sensors.

13. The method of claim 9, wherein the obstruction is determined to be present based on one or more of images of the route, video of the route, radar data from a radar system, lidar data from a lidar system, or weight data from a scale as the one or more characteristics of the route.

14. The method of claim 9, wherein the one or more characteristics of the route are monitored from a sensor assembly disposed onboard a mobile device.

15. The method of claim 9, further comprising communicating plural warning bulletins to the one or more vehicles to direct the one or more vehicles to slow or stop movement before reaching the obstruction, wherein a first warning bulletin communicated to a first vehicle automatically controls the brake system of the first vehicle to have a first brake setting to slow movement of the first vehicle, and a different, second warning bullet communicated to a second vehicle automatically controls the brake system of the second vehicle to have a second brake setting to stop movement of the second vehicle.

16. The method of claim 9, wherein the one or more warning bulletins are communicated to the one or more vehicles to direct the one or more vehicles to travel onto another route and avoid the obstruction before reaching the obstruction.

17. The method of claim 9, further comprising communicating the warning bulletin to a first vehicle of the one or more vehicles based on the location of the first vehicle being within a threshold distance away from the obstruction, wherein the warning bulletin is not communicated to a second vehicle of the one or more vehicles based on the location of the second vehicle being outside of the threshold distance away from the obstruction.

18. A system comprising:
one or more processors configured to receive sensor data from sensor assemblies at different crossings of routes on which vehicles travel, the one or more processors configured to determine whether an obstruction is present in one or more of the crossings based on the sensor data, locations of the vehicles, and speeds of travel of the vehicles,
the one or more processors configured to determine speeds of movement of the vehicles,
the one or more processors configured to wirelessly control movement of one or more of the vehicles responsive to determining that the obstruction is present on the one or more crossings by wirelessly communicating a notification signal to the one or more vehicles,
wherein the one or more processors are configured to automatically control a brake setting to control movement of the one or more vehicles responsive to determining that the location of the one or more vehicles is within a threshold distance away from obstruction, the brake setting based on the speed of movement of the vehicles.

19. The system of claim 18, wherein the one or more processors are configured to receive different types of the sensor data the sensor assemblies.

20. The system of claim 18, wherein the one or more processors are configured to receive one or more of an image, a video, radar data, lidar system data, or a weight measurement as the sensor data.

* * * * *